United States Patent
Lin et al.

(10) Patent No.: US 8,760,411 B2
(45) Date of Patent: Jun. 24, 2014

(54) METHOD FOR DETERMINING THE NUMBER OF FINGERS ON A SENSING DEVICE

(75) Inventors: Jao-Ching Lin, Taipei (TW); Linabel Chu, Taipei (TW); Yen-Fu Liu, Taipei County (TW); John Shen, Tainan (TW)

(73) Assignee: Touchscreen Gestures, LLC, Dallas, TX (US)

( * ) Notice: Subject to any disclaimer, the term of this patent is extended or adjusted under 35 U.S.C. 154(b) by 1066 days.

(21) Appl. No.: 12/165,747

(22) Filed: Jul. 1, 2008

(65) Prior Publication Data

US 2009/0184934 A1    Jul. 23, 2009

(30) Foreign Application Priority Data

Jan. 17, 2008  (TW) ............................... 97101760 A

(51) Int. Cl.
*G06F 3/041*    (2006.01)
(52) U.S. Cl.
USPC .......................................... 345/173; 345/174

(58) Field of Classification Search
CPC ..... G06F 3/044; G06F 3/041; G06F 3/04104; G06F 2203/04104; G08C 21/00
USPC .................................. 345/156–157, 173–174
See application file for complete search history.

(56) References Cited

U.S. PATENT DOCUMENTS

| 4,455,452 A * | 6/1984 | Schuyler .................... 178/18.06 |
| 5,825,352 A * | 10/1998 | Bisset et al. ................... 345/173 |
| 2009/0174675 A1* | 7/2009 | Gillespie et al. .............. 345/173 |
| 2011/0102339 A1* | 5/2011 | Lin et al. ....................... 345/173 |

* cited by examiner

*Primary Examiner* — Kenneth Bukowski
(74) *Attorney, Agent, or Firm* — Winston Hsu; Scott Margo

(57) ABSTRACT

A method for determining the number of fingers on a sensing device, which has a plurality of scanlines, includes the steps of: identifying the scanlines that generate a detecting signal, which has a value greater than a threshold value; finding adjacent ones of the scanlines; forming at least one group from the adjacent ones of the scanlines thus found; and counting the number of the scanlines in the at least one group thus formed in order to determine the number of fingers on the sensing device.

10 Claims, 8 Drawing Sheets

METHOD FOR DETERMINING THE NUMBER OF FINGERS ON A SENSING DEVICE

CROSS-REFERENCE TO RELATED APPLICATION

This application claims priority of Taiwanese application no. 097101760, filed on Jan. 17, 2008.

BACKGROUND OF THE INVENTION

1. Field of the Invention

This invention relates to a method for determining the number of fingers on a sensing device, more particularly to a relatively accurate method for determining the number of fingers on a sensing device.

2. Description of the Related Art

A single-finger sensing device for emulating a computer mouse is well known in the art. With the single-finger sensing device, commonly used functions, such as the click-and-drag function, are more difficult to perform than with the computer mouse. To solve this problem, it has been proposed to use a multi-finger sensing device. In U.S. Pat. No. 5,825,352, there is disclosed a conventional method for determining the number of fingers on a sensing device that has a plurality of scanlines. As illustrated in FIG. 1, the sensing device 1 has a plurality of scanlines 11 (only one of the scanlines 11 is shown in FIG. 1). The conventional method includes the steps of:

A) defining a maximum value 10, and a minimum value 20 less than the maximum value 10;

B) when the number of detecting signals 101 generated by the scanline 11 of the sensing device 1 is one and when the detecting signal 101 has a maxima that is not less than the maximum value 10, determining the number of the fingers 30 on the sensing device 1 to be one;

C) when the number of the detecting signals 101, 102 generated by the scanline 11 of the sensing device 1 is two and when only one of the detecting signals 101 has a maxima that is not less than the maximum value 10, determining the number of the fingers 30 on the sensing device 1 to be one; and D) when the number of the detecting signals 101, 102 generated by the scanline 11 of the sensing device 1 is two, when each of the detecting signals 101, 102 has a maxima that is greater than the maximum value 10, and when a minima between the detecting signals 101, 102 is less than the minimum value 20, determining the number of the fingers 30 on the sensing device 1 to be two.

The aforementioned conventional method is disadvantageous in that, as illustrated in FIG. 2, it is incapable of distinguishing between a detecting signal 101 generated by a scanline 11 when the corresponding scanline 11 detected a finger 30 and a detecting signal 100 generated by a scanline 11 due to a noise on the corresponding scanline 11.

SUMMARY OF THE INVENTION

Therefore, the object of the present invention is to provide a method for determining the number of fingers on a sensing device that can overcome the aforesaid drawback of the prior art.

According to an aspect of the present invention, a method for determining the number of fingers on a sensing device, which has a plurality of scanlines, comprises the steps of:

A) scanning the scanlines;

B) identifying the scanlines scanned in step A) that generate a detecting signal, which has a value greater than a threshold value;

C) finding adjacent ones of the scanlines identified in step B);

D) forming at least one group from the adjacent ones of the scanlines found in step C); and E) counting the number of the scanlines in the at least one group formed in step D) in order to determine the number of fingers on the sensing device.

According to another aspect of the present invention, a method for determining the number of fingers on a sensing device, which has a plurality of first scanlines and a plurality of second scanlines that intersect the first scanlines, comprises the steps of:

A) scanning the first and second scanlines;

B) identifying the first and second scanlines scanned in step A) that generate a detecting signal, which has a value greater than a threshold value;

C) finding adjacent ones of the first scanlines and adjacent ones of the second scanlines identified in step B);

D) forming at least one first group from the adjacent ones of the first scanlines found in step C), and at least one second group from the adjacent ones of the second scanlines found in step C);

E) when the number of the at least one first group is equal to the number of the at least one second group formed in step D), counting the number of the first scanlines in the at least one first group in order to determine the number of the fingers on the sensing device;

F) when the number of the at least one first group is less than the number of the at least one second group formed in step D), counting the number of the first scanlines in the at least one first group in order to determine the number of the fingers on the sensing device; and G) when the number of the at least one second group is less than the number of the at least one first group formed in step D), counting the number of the second scanlines in the at least one second group in order to determine the number of the fingers on the sensing device.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
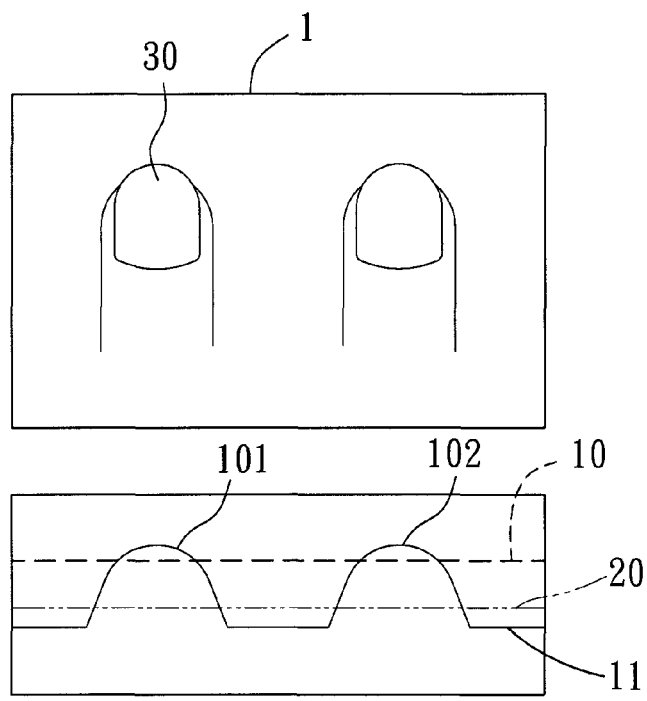
FIG. 1 is a schematic view illustrating an exemplary state where a scanline of a conventional sensing device detects a pair of fingers.
Figure 2:
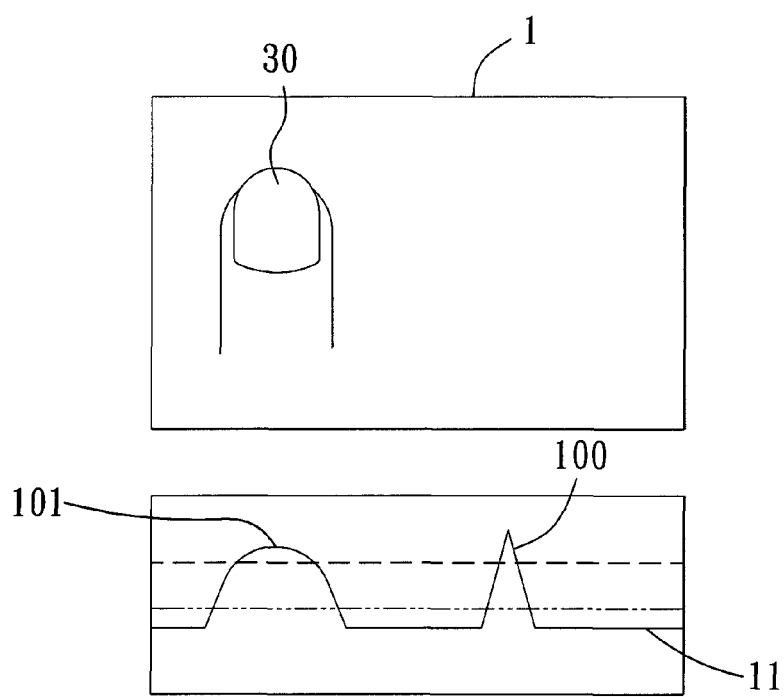
FIG. 2 is a schematic view illustrating an exemplary state where the scanline of the conventional sensing device generates a detecting signal due to a noise.
Figure 3:
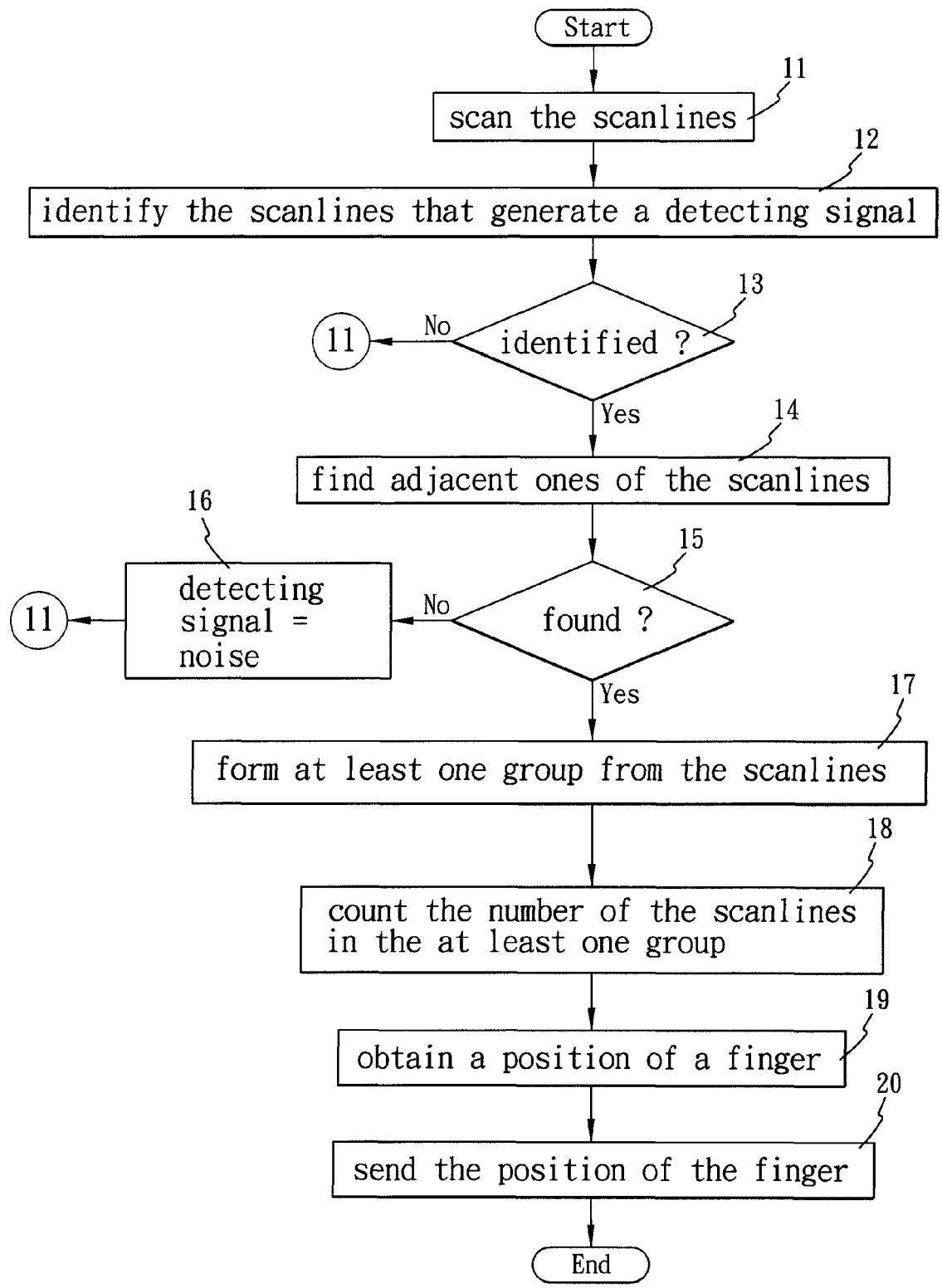
FIG. 3 is a flowchart of the first preferred embodiment of a method for determining the number of fingers on a sensing device according to this invention.

The first preferred embodiment of a method for determining the number of fingers on a sensing device according to this invention will now be described with reference to FIG. 3.

Figure 4:
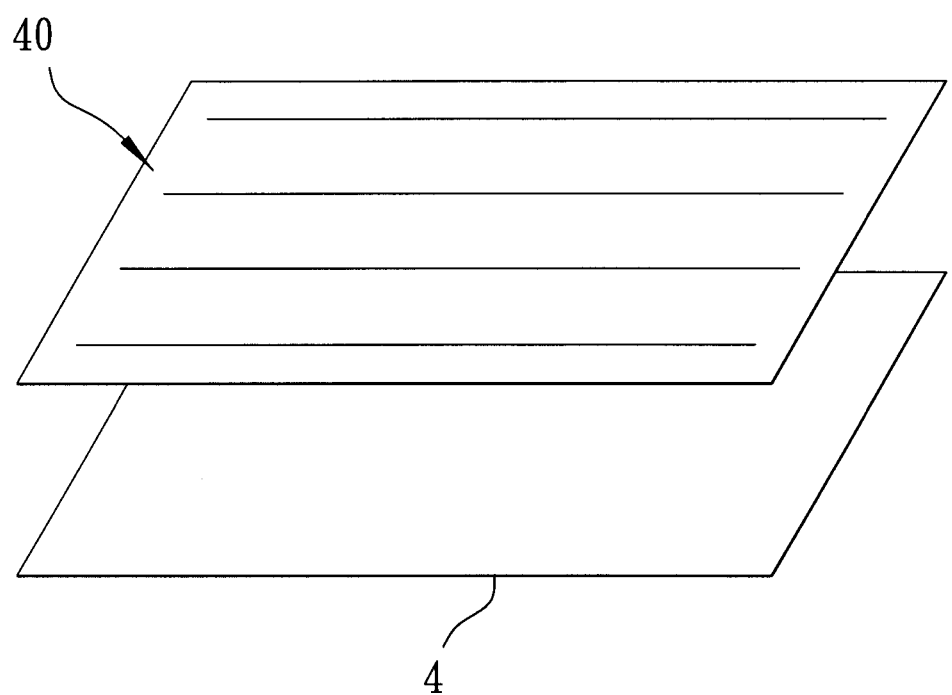
FIG. 4 is a perspective view illustrating scanlines of the sensing device.

In this embodiment, as illustrated in FIG. 4, the sensing device 4 is a capacitive-type sensing device and has a plurality of scanlines 40.

In an alternative embodiment, the sensing device 4 may be a resistive-type sensing device, an inductive-type sensing device, a light wave-type sensing device, or a sound wave-type sensing device.

In step 11, the scanlines 40 are scanned.

In this step, the scanlines 40 may be scanned simultaneously, or using one of an interlaced scanning and a non-interlaced scanning In step 12, the scanlines 40 scanned in step 11 that generate a detecting signal, which has a value greater than a threshold value, are identified.

Figure 5:
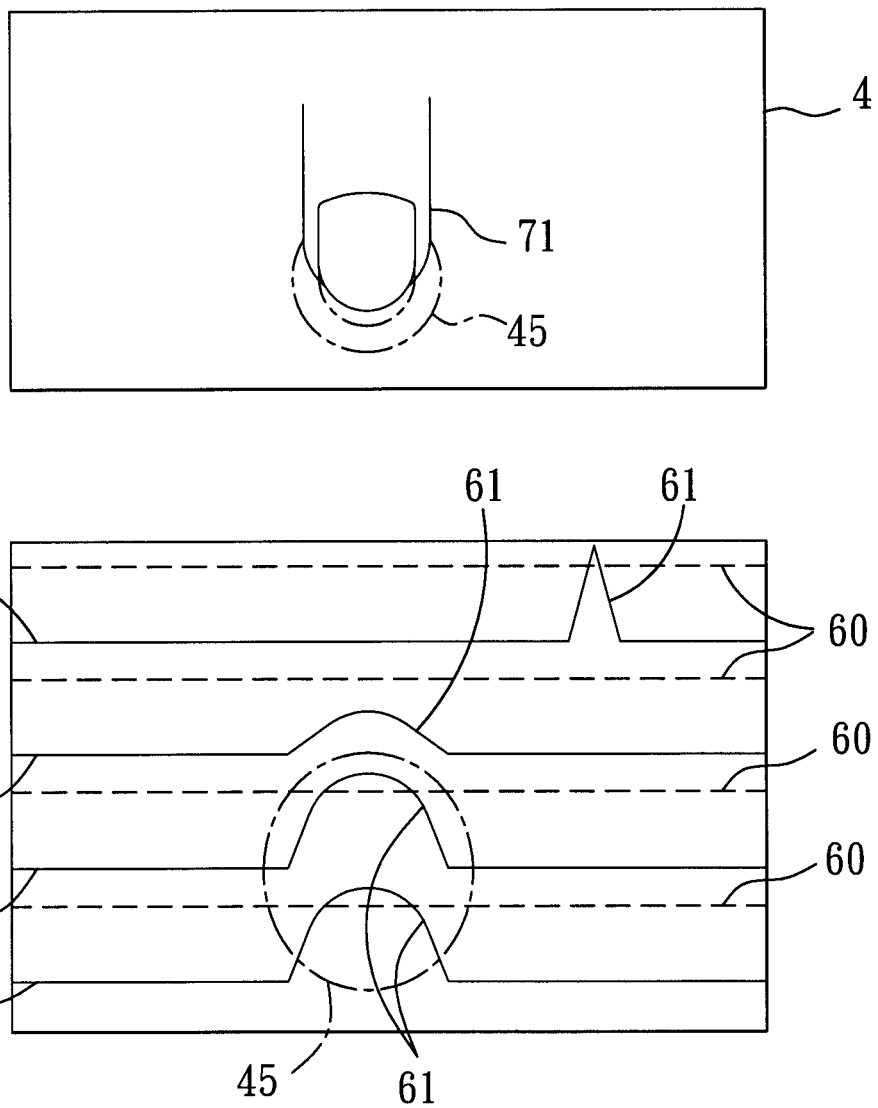
FIG. 5 is a schematic view illustrating an exemplary state where the scanlines detect a finger.

As illustrated in FIG. 5, since the value of the detecting signal 61 generated by each of the scanlines 41, 42, 44 is greater than the threshold value 60, in this step, the scanlines 41, 42, 44 are identified. Moreover, since the value of the detecting signal 61 generated by the scanline 43 is not greater than the threshold value 60, the detecting signal 61 generated by the scanline 43 is regarded as a noise and is simply ignored.

In step 13, when none of the scanlines 40 is identified in step 12, the flow goes back to step 11. Otherwise, the flow proceeds to step 14.

In step 14, adjacent ones of the scanlines 40 identified in step 12 are found.

In this embodiment, it is assumed that the scanlines 40, which generate the detecting signal 61, detect a finger 71 only when at least two of the corresponding scanlines 40 are adjacent. That is, when the corresponding scanlines 40 are not adjacent, it is assumed that the detecting signals 61 generated by the corresponding scanlines 40 are noises and are simply ignored.

As illustrated in FIG. 5, since the scanlines 41, 42 identified in step 12 are adjacent, in this step, the scanlines 41, 42 are found. Moreover, since the scanlines 41, 42 are not adjacent to the scanline 44, the detecting signal 61 generated by the scanline 44 is regarded as a noise and is simply ignored.

It should be apparent to those skilled in the art that the value of the detecting signal 61 generated by each of the scanlines 41, 42, 43 is a voltage or current value, which is converted from a reference value.

In step 15, when there are no adjacent scanlines 40 found in step 14, the flow proceeds to step 16. Otherwise, the flow proceeds to step 17.

In step 16, the detecting signals 61 generated by the scanlines 40 identified in step 12 are regarded as noises. Thereafter, the flow goes back to step 11.

In step 17, at least one group is formed from the adjacent ones of the scanlines 40 found in step 14.

As illustrated in FIG. 5, in this step, a group 45 is formed from the scanlines 41, 42.

In step 18, the number of the scanlines 40 in the at least one group 45 formed in step 17 is counted in order to determine the number of fingers 71 on the sensing device 4.

In this embodiment, when the number of the scanlines 40 in a group 45 formed in step 17 is not greater than a predetermined value, preferably three, the number of the fingers 71 in the corresponding group 45 is determined to be one. On the other hand, when the number of the scanlines 40 in a group 45 formed in step 17 is greater than the predetermined value, the number of the fingers 71 in the corresponding group 45 is determined to be more than one.

As illustrated in FIG. 5, since the number of the scanlines 41, 42 in the group 45 formed in step 17 is two and is therefore not greater than the predetermined value, in this step, the number of the fingers 71 in the group 45 is determined to be one. Moreover, when the group 45 is the only group formed in step 17, the number of the fingers 71 on the sensing device 4 may be determined as one.

Figure 6:
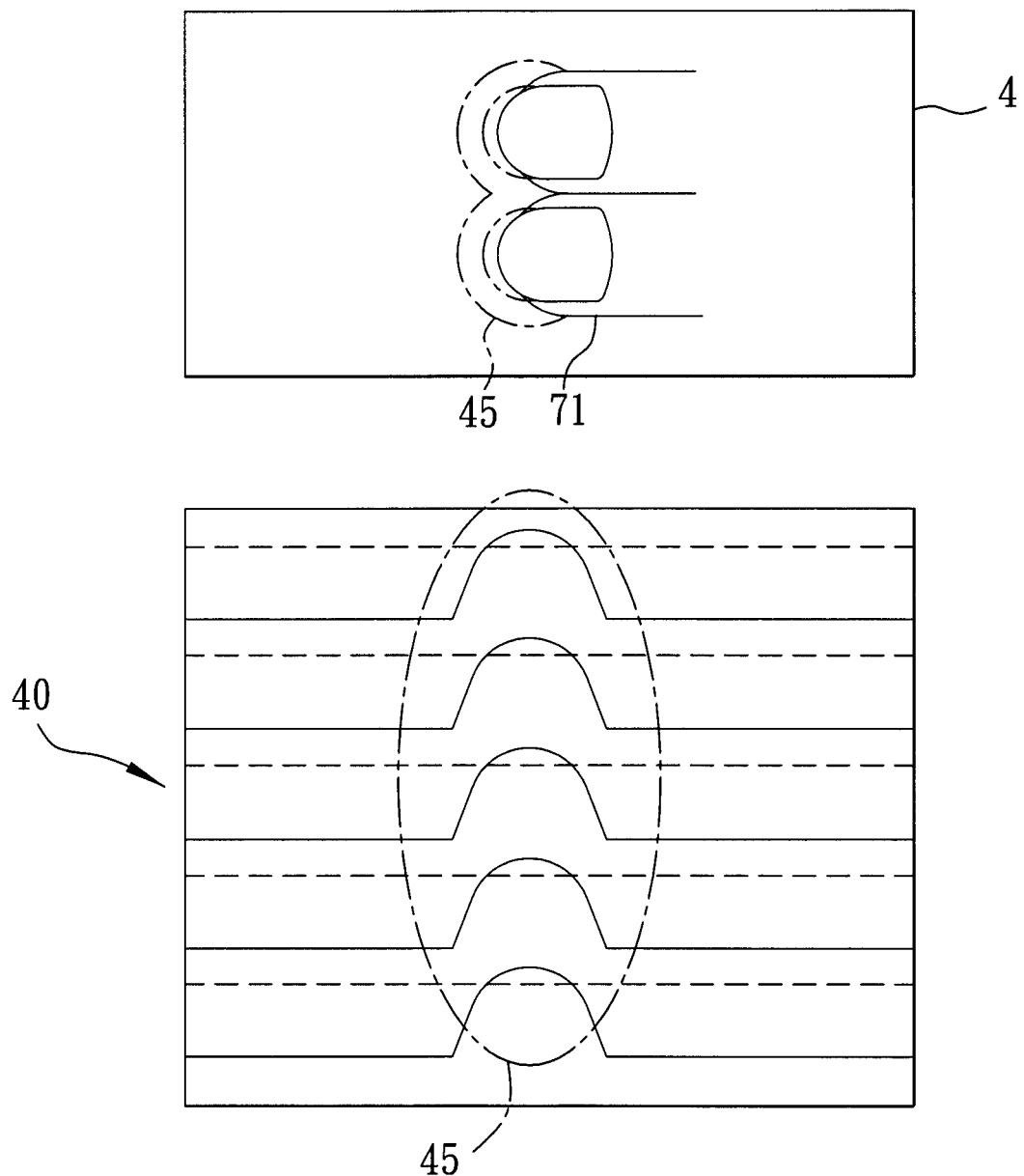
FIG. 6 is a schematic view illustrating an exemplary state where the scanlines detect a pair of fingers.

It is noted that, as illustrated in FIG. 6, since the number of the scanlines 40 in the group 45 is five and is therefore greater than the predetermined value, the number of the fingers 71 in the group 45 is determined in this step to be more than one, i.e., two. As such, when the group 45 is the only group 45 formed in step 17, the number of the fingers 71 on the sensing device 4 may be determined as two.

It is further noted that when the number of the distinct groups 45 formed in step 17 is three and when the number of the scanlines 40 in each of the groups 45 is determined to be two, the number of the fingers 71 on the sensing device 4 may be determined as three.

In step 19, a position of the finger 71/positions of the fingers 71 on the sensing device 4 is/are obtained based on the values of the detecting signals 61 of the scanlines 40 in the corresponding group 45.

In this embodiment, step 19 includes the sub-steps of:

19-1) assigning each of the scanlines 40 with a weight.

For instance, when there are eight scanlines 40, in this step, the scanlines 40 may be assigned with weights from 1 to 8 in a consecutive order.

19-2) obtaining a summation of the product of the weight of each of the scanlines 40 in the corresponding group 45 and the value of the detecting signal 61 generated by a respective one of the scanlines 40 in the corresponding group 45.

For example, as illustrated in FIG. 5, when the weights assigned in sub-step 19-1) to the scanlines 41, 42 in the group 45 are 2 and 3, respectively, and when the value of the detecting signal 61 generated by each of the scanlines 41, 42 in the group 45 is 0.5, in this sub-step, the summation thus obtain is 2.5. That is, $$(2 \times 0.5) + (3 \times 0.5) = 2.5$$

19-3) obtaining a sum of the values of the detecting signals 61 generated by the scanlines 40 in the corresponding group 45.

In the example, since the value of the detecting signal 61 generated by each of the scanlines 41, 42 in the group 45 is 0.5, in this sub-step, the sum obtained is 1.0 That is, $$0.5 + 0.5 = 1.0$$

19-4) obtaining a quotient of the values obtained in sub-steps 19-2) and 19-3).

Since the values obtained in sub-steps 19-2) and 19-3) are respectively 2.5 and 1.0, in this sub-step, the quotient obtained is 2.5. That is, 2.5/1.0=2.5

As such, the position of the finger 71 obtained in this step is between the scanlines 41, 42.

In step 20, the position of the finger 71/positions of the fingers 71 obtained in step 19 is/are sent to a finger movement-detecting device (not shown).

The finger movement-detecting device is operable so as to detect movement of a finger 71 on the sensing device 4 based on the position of the finger 71 sent thereto, so as to determine whether to accept or ignore the movement of the finger 71 detected thereby, and so as to determine whether the movement of the finger 71 detected thereby is one continuous movement or two separate movements based on a time gap between detected movements of the finger 71.

Since the feature of the invention does not reside in the particular configuration of the finger movement-detecting device, which is well known to those skilled in the art, a detailed description thereof will not be provided herein for the sake of brevity.

Figure 7A:
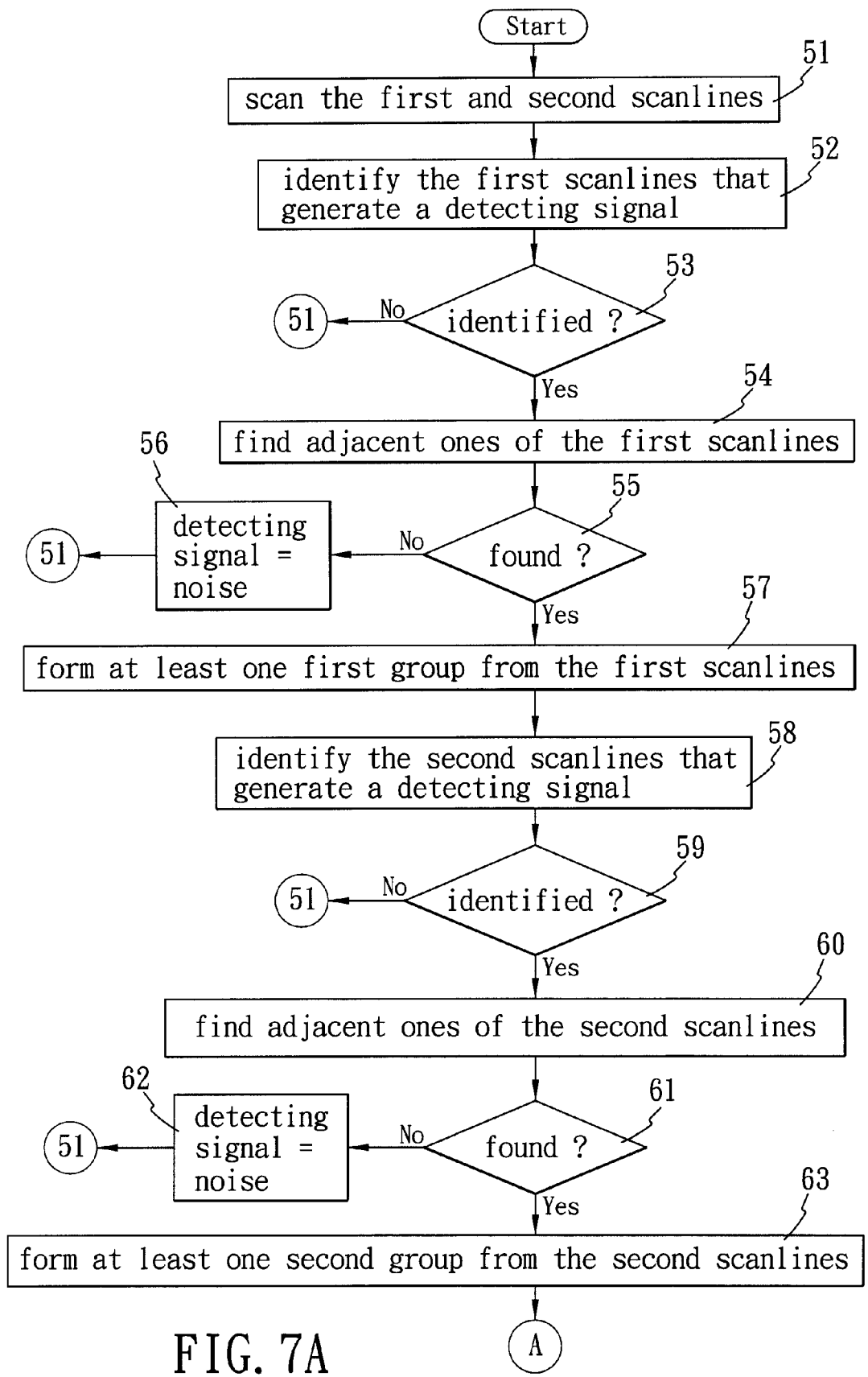
FIGS. 7A and 7B are flowcharts of the second preferred embodiment of a method for determining the number of fingers on a sensing device according to this invention.
Figure 7B:
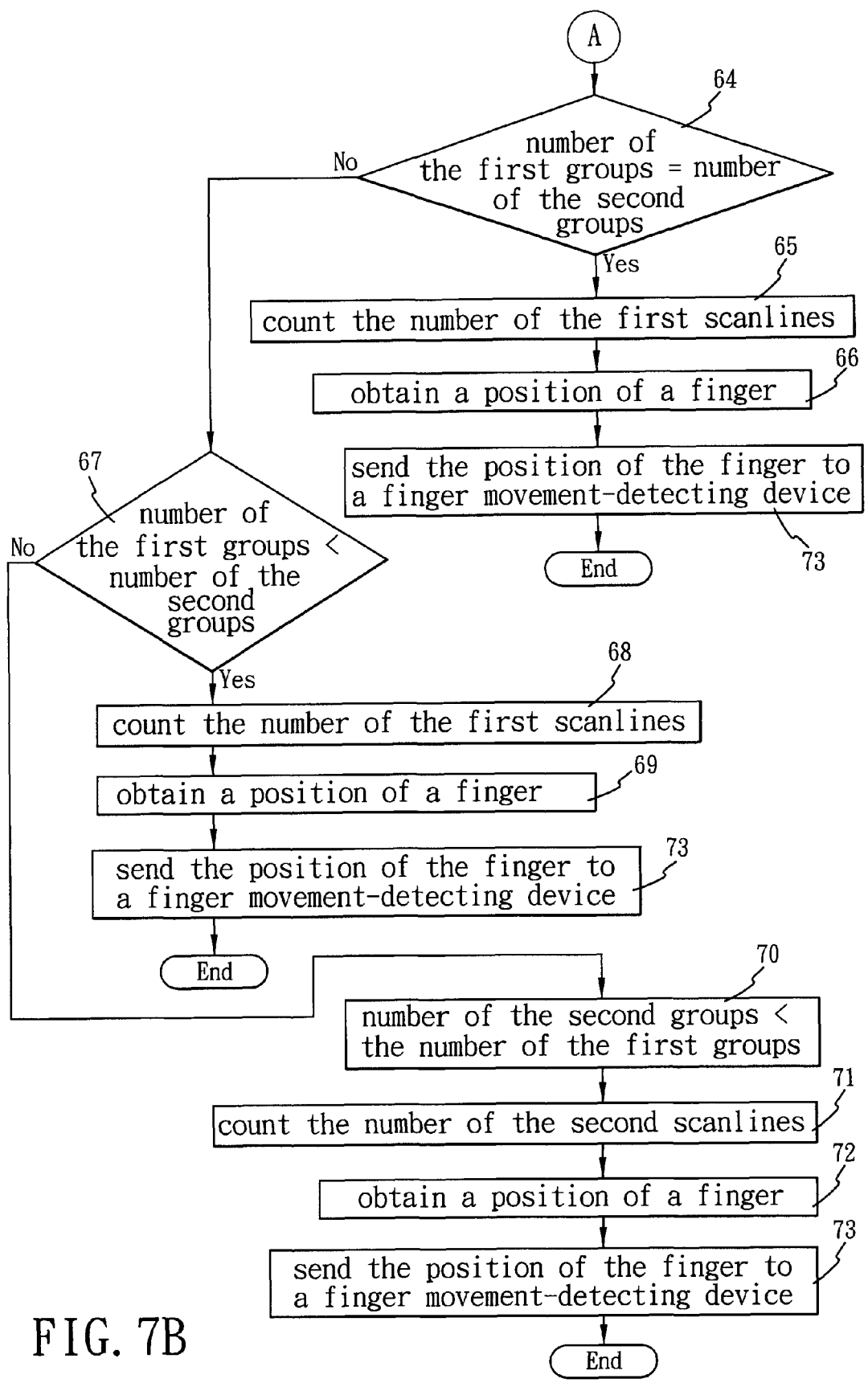

The second preferred embodiment of a method for determining the number of fingers on a sensing device according to this invention will now be described with reference to FIGS. 7A and 7B.

Figure 8:
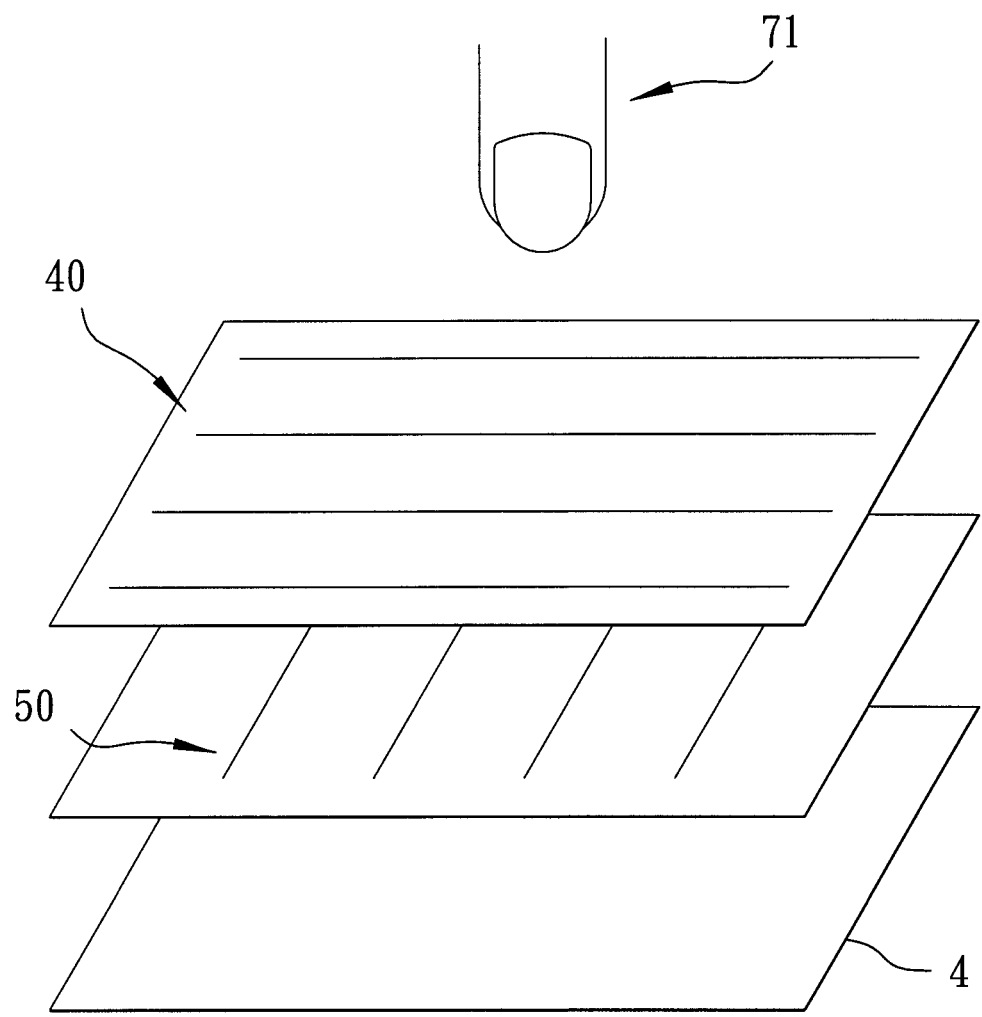
FIG. 8 is a perspective view illustrating first scanlines and second scanlines of the sensing device.

In this embodiment, as illustrated in FIG. 8, the sensing device 4 has a plurality of parallel first scanlines 40, and a plurality of parallel second scanlines 50 that are transverse to and that intersect the first scanlines 40.

In an alternative embodiment, the first scanlines 40 may not be parallel, the second scanlines 50 may not be parallel, and the second scanlines 50 may not be transverse to the first scanlines 40.

In step 51, the first and second scanlines 40, 50 are scanned.

In this step, both of the first scanlines 40 and the second scanlines 50 or either one of the first scanlines 40 or the second scanlines 50 may be scanned simultaneously, or using one of an interlaced scanning and a non-interlaced scanning In step 52, the first scanlines 40 scanned in step 51 that generate a detecting signal, which has a value greater than a first threshold value, are identified.

In step 53, when there are no first scanlines 40 identified in step 52, the flow goes back to step 51. Otherwise, the flow proceeds to step 54.

In step 54, adjacent ones of the first scanlines 40 identified in step 52 are found.

In step 55, when there are no adjacent first scanlines 40 found in step 54, the flow proceeds to step 56. Otherwise, the flow proceeds to step 57.

In step 56, the detecting signals 61 generated by the first scanlines 40 identified in step 52 are regarded as noises. Thereafter, the flow goes back to step 51.

In step 57, at least one first group is formed from the adjacent ones of the first scanlines 40 found in step 54.

In step 58, the second scanlines 50 scanned in step 51 that generate a detecting signal, which has a value greater than a second threshold value, are identified.

In step 59, when none of the second scanlines 50 is identified in step 58, the flow goes back to step 51. Otherwise, the flow proceeds to step 60.

In step 60, adjacent ones of the second scanlines 50 identified in step 58 are found.

In step 61, when there are no adjacent second scanlines 50 found in step 60, the flow proceeds to step 62. Otherwise, the flow proceeds to step 63.

In step 62, the detecting signals 61 generated by the second scanlines 50 identified in step 58 are regarded as noises. Thereafter, the flow goes back to step 51.

In step 63, at least one second group is formed from the adjacent ones of the second scanlines 50 found in step 60.

In step 64, when the number of the at least one first group 45 formed in step 57 is equal to the number of the at least one second group formed in step 63, the flow proceeds to step 65. Otherwise, the flow proceeds to step 67.

In step 65, the number of the first scanlines 40 in the at least one first group 45 formed in step 57 is counted in order to determine the number of the fingers 71 on the sensing device 4.

In this step, the number of the fingers 71 in a first group 45 formed in step 57 is determined to be one when the number of the first scanlines 40 in the corresponding first group 45 is not greater than the predetermined value. On the other hand, the number of the fingers 71 in a first group 45 formed in step 57 is determined to be more than one when the number of the first scanlines 40 in the corresponding first group 45 is greater than the predetermined value.

In step 66, a position of the finger/positions of the fingers 71 on the sensing device 4 is/are obtained based on the values of the detecting signals 61 of the first scanlines 40 in the corresponding first group 45. Thereafter, the flow proceeds to step 73.

In step 67, when the number of the at least one first group 45 formed in step 57 is less than the number of the at least one second group formed in step 63, the flow proceeds to step 68. Otherwise, the flow proceeds to step 70.

In step 68, the number of the first scanlines 40 in the at least one first group 45 formed in step 57 is counted in order to determine the number of the fingers 71 on the sensing device 4.

In this step, the number of the fingers 71 in a first group 45 formed in step 57 is determined to be one when the number of the first scanlines 40 in the corresponding first group 45 is not greater than the predetermined value. On the other hand, the number of the fingers 71 in a first group 45 formed in step 57 is determined to be more than one when the number of the first scanlines 40 in the corresponding first group 45 is greater than the predetermined value.

In step 69, a position of the finger 71/positions of the fingers 71 on the sensing device 4 is/are obtained based on the values of the detecting signals 61 of the first scanlines 40 in the corresponding first group 45. Thereafter, the flow proceeds to step 73.

In step 70, it is determined that the number of the at least one second group formed in step 63 is less than the number of the at least one first group 45 formed in step 57, and the flow proceeds to step 71.

In step 71, the number of the second scanlines 50 in the at least one second group formed in step 63 is counted in order to determine the number of the fingers 71 on the sensing device 4.

In this step, the number of the fingers 71 in a second group formed in step 63 is determined to be one when the number of the second scanlines 50 in the corresponding second group is not greater than the predetermined value. On the other hand, the number of the fingers 71 in a second group formed in step 63 is determined to be more than one when the number of the second scanlines 50 in the corresponding second group is greater than the predetermined value.

In step 72, a position of the finger 71/positions of the fingers 71 on the sensing device 4 is/are obtained based on the values of the detecting signals 61 of the second scanlines 50 in the corresponding second group. Thereafter, the flow proceeds to step 73.

In step 73, the position of the finger/positions of the finger is/are sent to the finger movement-detecting device.

Since the procedures of obtaining the position of the finger 71 on the sensing device 4 in this embodiment are similar to those described hereinabove in connection with the previous embodiment, a detailed description of the same will be dispensed with herein for the sake of brevity.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for determining the number of fingers on a sensing device that has a plurality of scanlines, said method comprising the steps of:
   A) scanning the scanlines;
   B) identifying the scanlines scanned in step A) that generate a detecting signal, which has a value greater than a threshold value;
   C) finding adjacent ones of the scanlines identified in step B);
   D) forming at least one group from the adjacent ones of the scanlines found in step C); and
   E) comparing a counted total number of the scanlines in the at least one group formed in step D) to a predetermined value such that a result of the comparison determines the number of fingers on the sensing device.

2. The method as claimed in claim 1, wherein, in step E), the number of the fingers in a group formed in step D) is determined to be one when the number of the scanlines in the group is not greater than the predetermined value.

3. The method as claimed in claim 2, further comprising the step of obtaining a position of the finger on the sensing device based on the values of the detecting signals of the scanlines in the corresponding group.

4. The method as claimed in claim 1, wherein, in step E), the number of the fingers in a group formed in step D) is determined to be more than one when the number of the scanlines in the group is greater than the predetermined value.

5. The method as claimed in claim 4, further comprising the step of obtaining positions of the fingers on the sensing device based on the values of the detecting signals of the scanlines in the corresponding group.

6. The method as claimed in claim 1, wherein, in step A), the scanlines are scanned using one of an interlaced scanning and a non-interlaced scanning.

7. A method for determining the number of fingers on a sensing device that has a plurality of scanlines, said method comprising the steps of:
   A) scanning the scanlines;
   B) identifying the scanlines scanned in step A) that generate a detecting signal which has a value greater than a threshold value and ignoring scanlines scanned in step A) that do not generate a detecting signal which has a value greater than the threshold value;
   C) finding adjacent ones of the scanlines identified in step B) and ignoring scanlines identified in step B) that are not adjacent to another scanline identified in step B);
   D) forming at least one group from the adjacent ones of the scanlines found in step C); and
   E) comparing a counted total number of the scanlines in the at least one group formed in step D) to a predetermined value such that a result of the comparison determines the number of fingers on the sensing device.

8. The method as claimed in claim 7, wherein, in step E), the number of the fingers in a group formed in step D) is determined to be one when the number of the scanlines in the group is not greater than the predetermined value.

9. The method as claimed in claim 8, further comprising the step of obtaining a position of the finger on the sensing device based on the values of the detecting signals of the scanlines in the corresponding group.

10. The method as claimed in claim 7, wherein, in step E), the number of the fingers in a group formed in step D) is determined to be more than one when the number of the scanlines in the group is greater than the predetermined value.

* * * * *